United States Patent [19]

Tourtier et al.

[11] Patent Number: 5,446,495
[45] Date of Patent: Aug. 29, 1995

[54] TELEVISION SIGNAL SUB-BAND CODER/DECODER WITH DIFFERENT LEVELS OF COMPATIBILITY

[75] Inventors: Philippe Tourtier; Jean-Francois Vial, both of Rennes; Jean-Louis Diascorn, Acigne; Michel Pecot, Thorigne-Fouillard, both of France

[73] Assignee: Thomson-CSF, Puteaux, France

[21] Appl. No.: 972,485

[22] PCT Filed: Jun. 9, 1992

[86] PCT No.: PCT/FR92/00514

§ 371 Date: Feb. 11, 1993

§ 102(e) Date: Feb. 11, 1993

[87] PCT Pub. No.: WO92/22985

PCT Pub. Date: Dec. 23, 1992

[30] Foreign Application Priority Data

Jun. 11, 1991 [FR] France .................. 91 07074

[51] Int. Cl.⁶ .................. H04N 7/01; H04N 7/12
[52] U.S. Cl. .................. 348/398
[58] Field of Search .............. 358/133, 140, 141, 135, 358/136, 138, 105; H04N 7/12, 7/01; 348/397, 398, 399, 400

[56] References Cited

U.S. PATENT DOCUMENTS

| | | | |
|---|---|---|---|
| 4,817,182 | 3/1989 | Adelson et al. | |
| 4,821,119 | 4/1989 | Gharavi | 348/400 |
| 4,827,336 | 5/1989 | Acampora et al. | |
| 4,829,378 | 5/1989 | LeGall | 358/133 |
| 4,918,524 | 4/1990 | Ansari et al. | 348/398 |
| 4,937,666 | 6/1990 | Yang | |
| 4,969,040 | 11/1990 | Gharavi | 358/136 |
| 5,097,331 | 3/1992 | Chen et al. | 348/398 |
| 5,187,575 | 2/1993 | Lim | 358/140 |
| 5,200,820 | 4/1993 | Gharavi | 358/105 |
| 5,202,760 | 6/1993 | Tourtier et al. | 358/141 |
| 5,220,422 | 6/1993 | Oh | 358/133 |
| 5,235,420 | 8/1993 | Gharavi | 358/136 |

FOREIGN PATENT DOCUMENTS

| | | |
|---|---|---|
| 0262109 | 3/1988 | European Pat. Off. |
| 2643531 | 8/1990 | France |
| 2654887 | 5/1991 | France |
| 2661062 | 10/1991 | France |

OTHER PUBLICATIONS

IEEE International Symposium on Circuits and Systems, New Orleans, La., May 1–3, 1990, vol. 2, P. E. Fleischer et al: "Coding of Advanced TV for BISDN Using Multiple Subbands", pp. 1314–1318.

ICASSP'89, Glasgow, Scotland, May 23–26, 1989, vol. 3, P. H. Westerink et al: "Progressive Transmission Of Images Using Subband Coding", pp. 1811–1814.

IEEE Transactions on Circuits and Systems for Video Technology, vol. 1, No. 2, Jun. 1991 (New York, US) H. Gharavi: "Subband Coding Algorithms For Video Applicaitons: Videophone to HDTV–Conferencing", pp. 174–813.

"A Family of VLSI Designs for the Motion Compensation Block–Matching Algorithm," Kun–Min Yang, Ming–Ting Sun, Lancelot Wu, ©1989 IEEE.

*Primary Examiner*—Tommy P. Chin
*Assistant Examiner*—Vu Le
*Attorney, Agent, or Firm*—Oblon, Spivak, McClelland, Maier & Neustadt

[57] ABSTRACT

A coder comprising banks of analysis filters (26, 27) for partitioning the spatio-temporal spectrum of each television image into sub-bands. The banks of analysis filters are coupled to devices for differential coding ($30_i$, $31_i$, $32_i$) for separately coding the signals obtained in each sub-band. The decoder comprises prediction loops (24; 25; 12, 17 ... 20, 3, 21, 22, 23) equal in number to the number of sub-bands for reconstructing each television image transmitted by the coder portion together with its level of resolution in each of the sub-bands.

8 Claims, 5 Drawing Sheets

| Band number by Coding | Band number by Compatibility | Permitted bands | Adjacent bands |
|---|---|---|---|
| 1 | 3 | all | 1,7,8,10,12 |
| 2 | 6 | 2,3,4,13,14,15,16 | 2,4,14,16 |
| 3 | 5 | 3,2,4,13,14,15,16 | 3,4,15,16 |
| 4 | 7 | 4,2,3,13,14,15,16 | 4,2,3 |
| 5 | 2 | all | 5,6,7 |
| 6 | 2 | all | 6,2,5,8 |
| 7 | 2 | all | 7,1,5,8 |
| 8 | 2 | all | 8,1,4,7,6 |
| 9 | 1 | all | 9,10,11 |
| 10 | 1 | all | 10,1,9,12 |
| 11 | 1 | all | 11,3,9,12 |
| 12 | 1 | all | 12,1,4,10,11 |
| 13 | 4 | 13,14,15,16 | 13,14,15 |
| 14 | 4 | 14,13,15,16 | 14,16,13 |
| 15 | 4 | 15,13,14,16 | 15,13,16 |
| 16 | 4 | 16,13,14,15 | 16,14,15 |

TELEVISION SIGNAL SUB-BAND CODER/DECODER WITH DIFFERENT LEVELS OF COMPATIBILITY

BACKGROUND OF THE INVENTION

1. Field of the Invention

The present invention relates to a television signal sub-band coder/decoder with various levels of compatibility. It applies in particular to systems for transmitting and receiving digital video signals.

2. Discussion of the Background

In television image transmission systems the multiplicity of resolution formats employed for conventional interlaced television, videophone, sequential television, and the advent of interlaced or sequential high-resolution television systems make it necessary to formulate compatible coding systems, be they upwardly or downwardly directed resolutions.

In upwards compatibility, a receiver working in a specified video format must be able to receive and display a signal transmitted in accordance with a higher format, that is to say a format according to which the resolution of the signal is greater. This is the case for example in a signal for sequential high-definition television, known by the abbreviation HDTV, which itself possesses a format higher than that of a conventional interlaced television signal. Conversely, in the case of downwards compatibility a receiver must be able to receive and display a signal of lesser resolution than its working format. Naturally, the diversities of resolutions entail a diversity of coding and decoding devices to be implemented and considerably complicate the handling of communications.

A solution to these problems which is known from Patent Application FR 2 654 887 likewise filed in the name of the Applicant, consists in carrying out at the level of the transmission coders a partitioning of each image to be transmitted into sub-bands in accordance with a same tree structure by filtering and decimation of the spatial frequency band of the signals to be transmitted whatever family they belong to, so as independently to code the signals of each sub-band before transmitting them by multiplexing over the transmission channel. On reception the decoders carry out the demultiplexing of the coded signals received in each sub-band by decoding the signals relating to each sub-band as a function of the resolution of the signals transmitted and of the inherent insolution of the receivers. However, in order for this solution to remain effective when the throughput over the transmission channel diminishes and in order to avoid for example the visual quality of the viewed images from deteriorating for throughputs less than 1.4 bits per pixel, it is necessary to introduce an additional inter-image coding taking into account the natural temporal correlation of the image sequences, this additional inter-image coding possibly consisting in a differential coding with motion compensation at the level of each sub-band. Naturally, motion compensation is carried out at the level of the sub-bands and not at the level of the full-definition image (that is to say the non-split image) in such a way as to ensure compatible coding of the images and to avoid drifting at the level of the compatible decoders. Estimation of the motion takes place over the non-split images in accordance with a technique known as "block matching" in accordance with which the image is partitioned into blocks, one motion vector per block being determined through a correlation calculation. This technique enables motion vectors calculated as integer numbers of pixels to be obtained. An estimation of vectors to half-pixel accuracy can also be obtained by firstly interpolating the images for example with a bilinear filter. The motion vectors can thus be divided by the sub-sampling factor for each sub-band under consideration so as to serve as basis for the motion compensations to be carried out in each of the latter. Instead of extracting the coded pixel next to the preceding sub-band from the value of the pixel to be coded, the corresponding procedures consist in extracting the value of a neighbouring pixel whose coordinates are calculated as a function of these motion vectors. Thus, when the components of the motion vector are integers, the problem reduces solely to a memory addressing problem since it suffices to fetch an existing pixel from memory. On the other hand, if the motion vector does not correspond to an integer number of pixels, the value of the pixel sought can only be interpolated. However, the known methods of interpolation with a given band lead to the use of several long filters in order to take into account the information contained in the adjacent bands, thus posing embodiment problems which are difficult to solve.

SUMMARY OF THE INVENTION

The aim of the invention is to overcome the above-mentioned disadvantages.

To this end, the subject of the invention is a television signal sub-band coder/decoder with different levels of compatibility, characterised in that it comprises, in the coder portion, banks of analysis filters for partitioning the spatio-temporal spectrum of each television image into sub-bands, the banks of analysis filters being coupled to devices for differential coding for separately coding the signals obtained in each sub-band and in that it comprises, in the decoder portion, prediction loops equal in number to the number of sub-bands for reconstructing each television image transmitted by the coder portion together with its level of resolution in each of the sub-bands.

BRIEF DESCRIPTION OF THE DRAWINGS

Other characteristics and advantages of the invention will emerge in the description which follows, given in relation to the attached drawings which represent.

DESCRIPTION OF THE PREFERRED EMBODIMENTS

Figure 1:
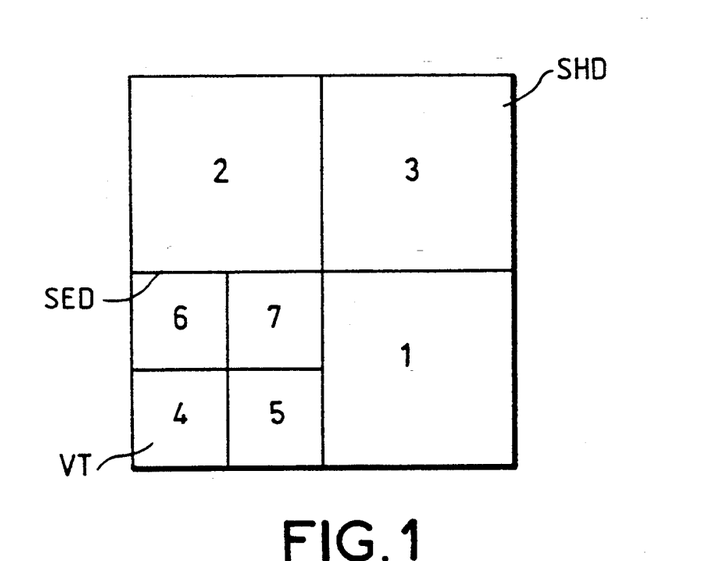
FIG. 1, a splitting of the spectrum of a television signal of SHD standard into SED and VT sub-bands.

In the implementation of the invention, the spectrum of the television signal to be coded is split into subbands in the manner represented in FIG. 1 where various levels of resolution of an image hierarchy defined by various standards are represented in a two-dimensional Fourier space in which the spatial frequencies of the image, measured in image width and height during a cycle, are registered. In FIG. 1 only the SHD, SED and VT standards designating respectively the format for sequential high-definition defined by images of 1250 lines transmitted at the rate of 50 images per second (1250/50/1:1), SED designating the format of sequential extended definition (625/50/1:1) defined by images of 625 lines transmitted at the rate of 50 images per second, and VT designating the format of the image with 312 sequential lines for videophone (312/50/1:1) have been represented and, in order to simplify the explanation, in what follows only the video signals with the sequential formats for the SHD, SED and VT standards have been considered, it being possible to apply the system and the method according to the invention to interlaced signals by using the equivalent sequential signals as described for example in Patent Application FR 2 654 887.

Figure 2:
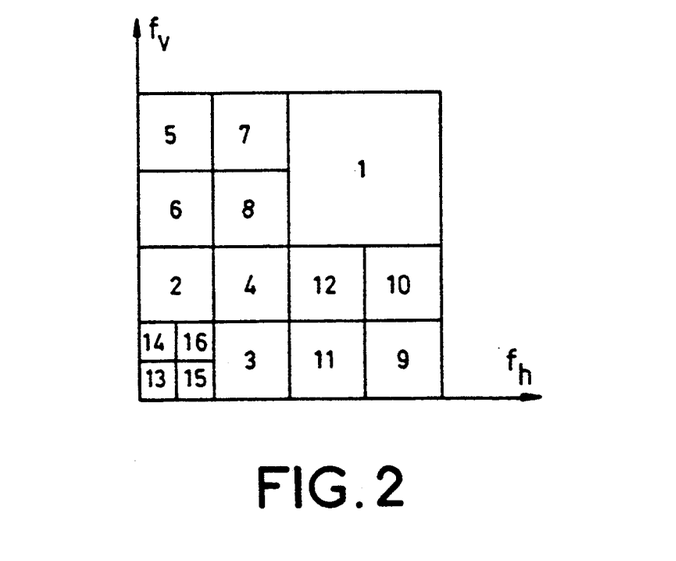
FIG. 2, a splitting of the spectrum of FIG. 1 in accordance with a sixteen-band splitting tree.

In the example of FIG. 1, in order to carry out a compatible coding/decoding between the three standards represented, each receiver must be capable of decoding and displaying, whatever its inherent level of resolution, the signal which it receives and which has any format from the 3 formats VT, SED or SHD. This turns the compatible coding system into a multiresolution coding system. To carry out a compatible inter-image coding of video signals, the method according to the invention carries out a hierarchical and compatible splitting into sub-bands of the images to be transmitted. The image which is thus split is reconstructed in a reception decoder by means of interpolation cells formed by cascading several cells. The almost perfect reconstruction of the image is obtained using the filters known by the abbreviation CQF for "conjugate quadrature filter" or else filters known by the abbreviation QMF for "quadrature mirror filter". By using this splitting and reconstruction principle the minimum tree which allows compatible coding between the three formats VT, SED and SHD of the spectrum represented in FIG. 1 is a seven-band tree. In this splitting the compatibility requirement is manifested simply through an independent processing of the three portions of the spectrum, of the low-frequency VT portion (band 4), of the SED spectrum and of the SHD spectrum. According to the invention any taking into account of the motion of the image is done independently in each of these three portions. However, since it seems that a partition by means of a seven-band tree does not lead to a decorrelation of the signals sufficient to allow effective scalar quantisation, additional partitions are necessary and in practice a good compromise is found by means of a sixteen-band tree as represented in FIG. 2.

As described earlier, to attain for example throughputs of the order of 0.8 bits per second, it is necessary to take into account the temporal correlation existing in the image sequences, without destroying the compatibility properties of the system, that is to say by complying with the independent processing operations for the VT (band 4), SEDC (bands 5, 6, 7) and SHDC (bands 1, 2, 3) portions of the spectrum of FIG. 1, so as to avoid any drifting at the level of the decoders. Indeed, taking for example the case of an SED decoder, since the latter can use only the information contained in the low-frequency bands, VT portion and SEDC additional portion, of the SHD signal of higher resolution transmitted, if at coder level the motion compensation is carried out using all the information from the SHD signal (VT, SEDC, SHDC portions), the SED decoder will no longer have access to the SHDC information and in this case will no longer be able to carry out a processing similar to that which was carried out at coder level. As a result, a drifting can appear on the decoded images.

Figure 3:
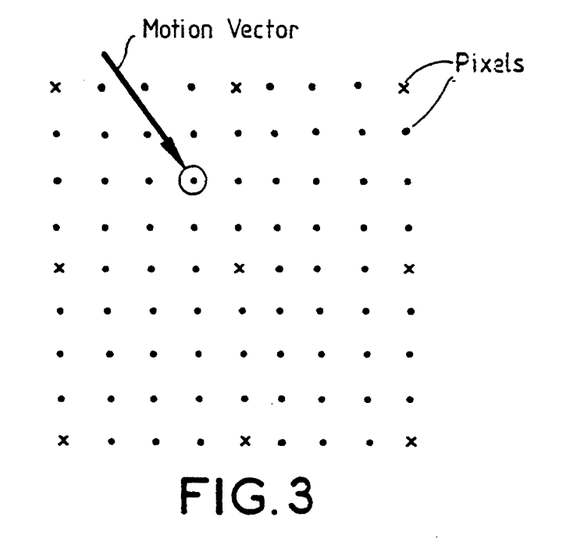
FIG. 3, a grid of pixels showing the principle of interpolation for reconstructing a decimated pixel in a sub-band as a function of the motion vector accompanying this pixel in the image.

A solution to this problem consists in using interpolation filters to interpolate the pixels in each sub-band by taking into account information contained in the adjacent sub-bands. The sub-sampling of the signals makes it possible to transform the motion compensation effected per whole pixel in the full-band image into fractional pixels at the levels of the sub-bands. Thus, as shown by the grid of FIG. 3, the characteristics of certain pixels decimated at the level of a sub-band can thus be recalculated from the pixels retained in the sub-band and from those retained in the adjacent sub-bands.

The advantage of proceeding thus results in the sampling mesh remaining similar to the original mesh and in it then being possible to carry out the motion compensation by a simple decoding if the estimation of the motion is effected by an integer number of pixels. This is achieved in particular using multiphase splitting filters of order N which split their impulse response h(n) into N phases hj, where j is an integer included between 0 and N−1, and which are defined by the relation $$h_j(n) = (h(j+nN)$$

These filters have the property of reconstructing all the decimated points. However, since it is in fact only necessary to reconstruct only the pixels corresponding to the estimated motion, the method according to the invention aims to use interpolation filters with shorter multiphase components, each component corresponding to a value of the motion vector, so as to work with multiphase component lengths of the same order as those filters for analyses and for sub-band synthesis.

Under these conditions calculation of the contribution of a band j to the interpolation of a point of a band i can be effected by taking one of the $N_j$ phases of the multiphase splitting to order $N_j$ of a filter $K_{ij}$ and the number of the phase to be taken into account is then determined by the shift V corresponding to the motion vector. By way of example, if K(n) is the impulse response of the filter $K_{ij}$, the multiphase splitting of order $N_j$ of this filter makes it possible to define $N_j$ phases $K_j$ of No. j where j is an integer ranging from 0 to N−1 such that, $K_j(n) = K_{(j+n.Nj)}$. Thus, for a splitting order $N_j=4$, the multiphase splitting of a filter containing n+1 phase samples, centered on the sample of order 0 will yield for an ordered sequence of samples such as (−6, −5... 0.1 ... 6) the following samples:

Phase 0 $K_j(-4)$, $K_j(0)$, $K_j(4)$, the origin being placed an sample 0

Phase 1 $K_j(-3)$, $K_j(1)$, $K_j(3)$, the origin being placed at sample 1

Phase 2 $K_j(-6)$, $K_j(-2)$, $K_j(2)$, $K_j(6)$, the origin being placed at sample 2 and Phase 3 $K_j(-5)$, $K_j(-1)$, $K_j(3)$, the origin being placed at sample 3.

Figure 4:
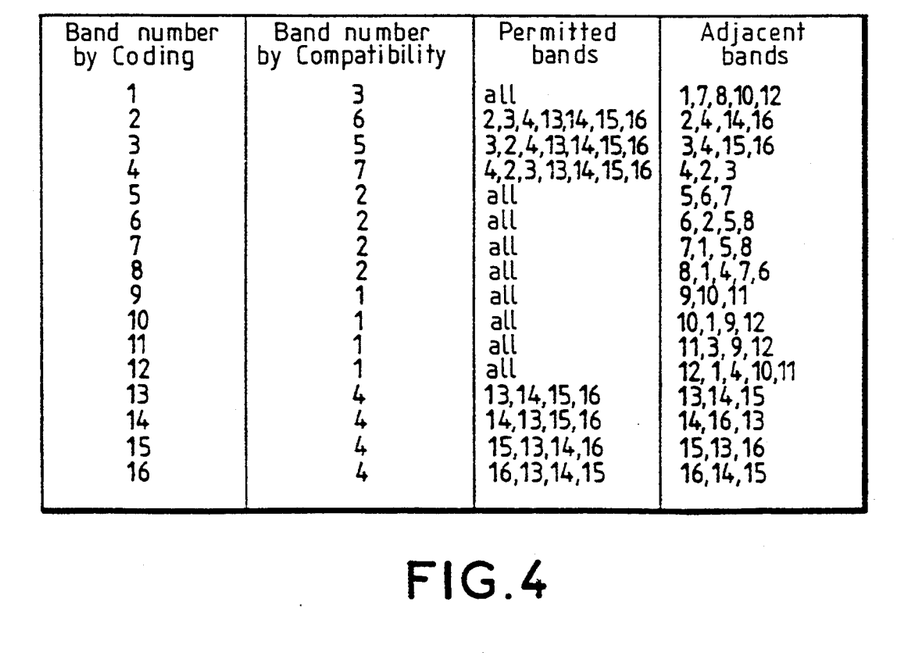
FIG. 4, a summary table of the permitted sub-bands adjacent to a given sub-band which can be used for the pixel interpolation calculation in an image.

Thus, if V is a multiple of $N_j$, phase 0 of the filter is used and nothing is modified, by contrast, in the contrary case the phase number n to be used is defined by $n = N_j - R$ where R is the remainder on dividing V by $N_j$. As already underlined earlier the interpolation of a point of a given band must, to be perfect, use the information contained in all the other bands, the contribution from these bands being determined by the filters $K_{ij}$. Owing to the compatibility constraint; it is not possible to use all the bands but in fact as shown by the table of FIG. 4 the contribution of all the bands does not seem indispensable. It seems that it is essentially the sub-bands adjacent to a sub-band under consideration which contribute most to the interpolation of the sub-band under consideration and that the contributions from the other sub-bands may be considered negligible.

In fact, by considering the optimal 16-band tree of FIG. 2 the use of the adjacent bands can be limited as follows.

For the bands numbered 13, 14, 15 and 16 the interpolation will need to use only the information from bands 13, 14, 15 and 16.

For bands 2, 3, 4 the interpolation will have to be limited to the use of bands 2, 3, 4, 13, 14, 15 and 16.

For bands 1, 5, 6, 7, 8, 9, 10, 11, 12 the interpolation of these bands will be able to use the information contained in all the other bands.

However, as shown by the last column of the table of FIG. 4 the use of adjacent bands can be further limited by not considering the bands situated adjacent to the boundaries delimiting the VT, SED, SHD regions, so as to considerably diminish the number of operations to be carried out and memory accesses.

In what follows a distinction is made between the tree for splitting into sub-bands of FIG. 1, necessary for compatibility and the splitting tree of FIG. 2 necessary for the coding. From the table of FIG. 4 it is clearly apparent that using the adjacent bands with the partition into 7 bands for the motion compensation is more effective than using the adjacent bands with the 16-band partition, and that the latter must lead to a much simpler embodiment.

Figure 5:
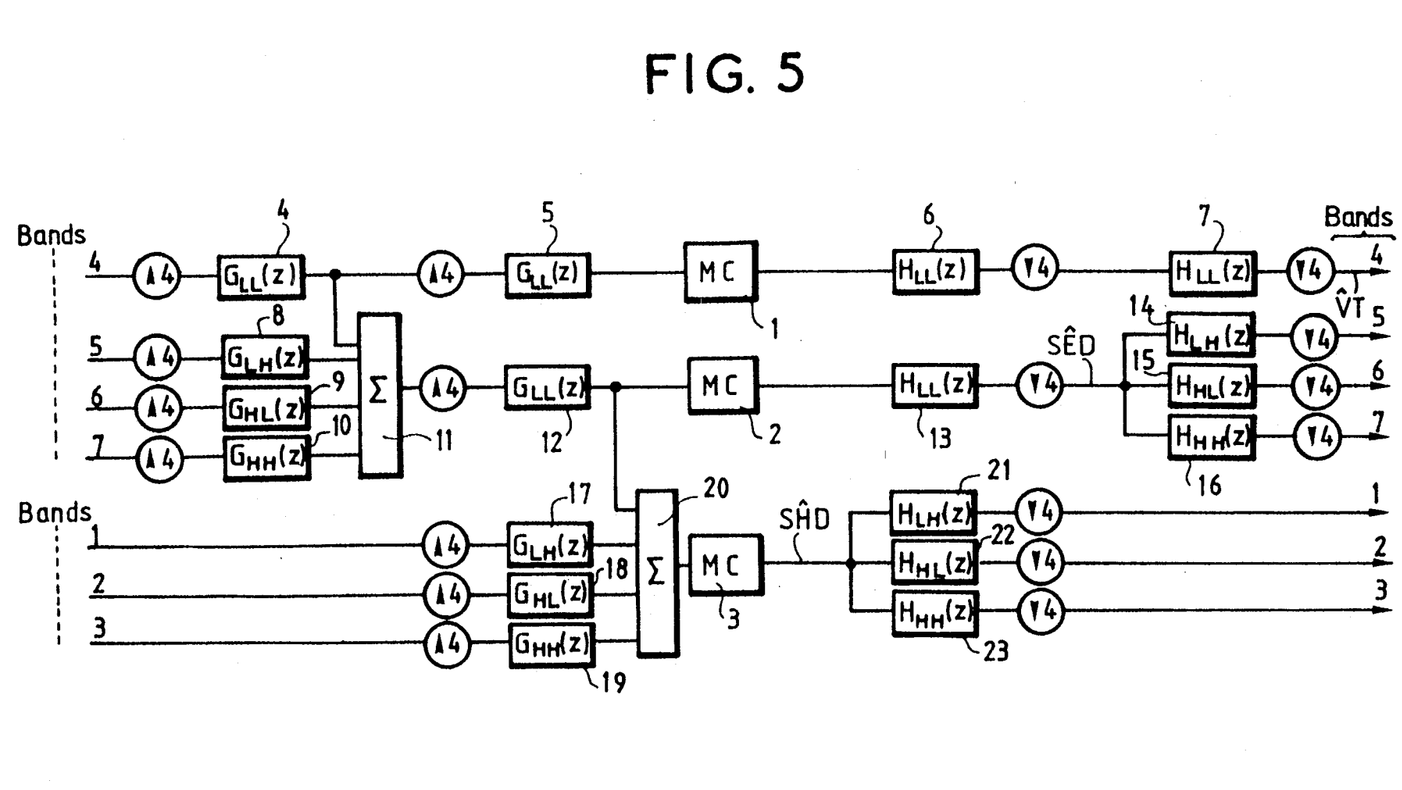
FIGS. 5 and 6, an embodiment of a motion compensation device according to the invention.

An embodiment of a corresponding motion compensation device is represented in FIG. 5. This embodiment avoids demonstrating the influence of the adjacent bands explicitly. In this embodiment the motion compensation takes place separately in each of the VT, SED and SHD sub-bands through motion compensation blocks bearing the references 1, 2, 3 in FIG. 5. In this scheme the motion compensation takes place in the current image while taking the pixels of the preceding image into consideration. The image is split into 7 sub-bands as indicated by the splitting tree of FIG. 1.

After two successive oversamplings by 2 in the horizontal and vertical directions of the image, the VT signal from band 4 is transformed in the mesh of original pixels by means of two low-pass reconstruction filters 4 and 5 with transfer function $G_{LL}(z)$.

The signal obtained is motion-compensated by the motion compensation block 1 and the result obtained is then twice decimated by 2 in the horizontal and vertical directions of the image to yield, after two successive low-pass filterings 6 and 7 with transfer function $H_{LL}(z)$, a VT prediction of the VT signal in the current image.

The signals of bands 5, 6 and 7 are likewise oversampled by two in the horizontal and vertical directions of the image before being applied to reconstruction filters 8, 9 and 10 respectively low- and high-pass, high-pass and low-pass, and twice high-pass in the horizontal and vertical directions of the image and with transfer function denoted $G_{LH}(z)$, $G_{HL}(z)$ and $G_{HH}(z)$ respectively.

A summation circuit 11 adds up the signals obtained at the output of the filters 4, 8, 9 and 10. The signal resulting from this addition is oversampled by two in the horizontal and vertical directions of the image and filtered by a low-pass reconstruction filter 12 in the two directions, horizontal and vertical, of the image. The signal obtained at the output of the filter 12 is motion-compensated by the motion compensation block 2 and the result obtained is then twice decimated by 2 in the horizontal and vertical directions of the image to yield, after a first filtering by two filters 13 and 14 respectively low-pass in the two directions, horizontal and vertical, of the image and with transfer functions denoted $H_{LL}(z)$ and $H_{LH}(z)$ respectively, a prediction signal in sub-band 5. A second filtering carried out by filter 13 and a filter 15 coupled in series yields, after two decimations, a motion-corrected prediction signal in band 6 and a second filtering signal produced by the filter 13 and a filter 16 which are coupled in series yields, after two decimations, a motion-corrected prediction signal in band 7, filters 15 and 16 having transfer functions denoted $H_{LL}(z)$ and $H_{HL}(z)$ respectively.

The signals of bands 1, 2 and 3 are also oversampled by two in the horizontal and vertical directions of the image before being applied to reconstruction filters 17, 18 and 19 respectively low- and high-pass, high- and low-pass, and twice high-pass in the two directions, horizontal and vertical, of the image and with transfer function denoted $G_{LH}(z)$, $G_{HL}(z)$ and $G_{HH}(z)$ respectively. The filtered signals obtained are applied to respective inputs of an adder circuit 20 in order to be added to the signal provided by the filter 12.

The signal resulting from this addition is applied to the input of the motion compensation block 3 in order to be motion-compensated. The motion-compensated signal obtained is in fact a reconstituted SHD signal which is in turn split into sub-bands 1, 2 and 3 after decimation by 2 in the horizontal and vertical directions of the image, by filters 21, 22, 23 respectively low- and high-pass, high- and low-pass and twice high-pass and with transfer functions denoted HLH(z), $H_{HL}(z)$ and $H_{HH}(z)$ respectively.

Figure 6:
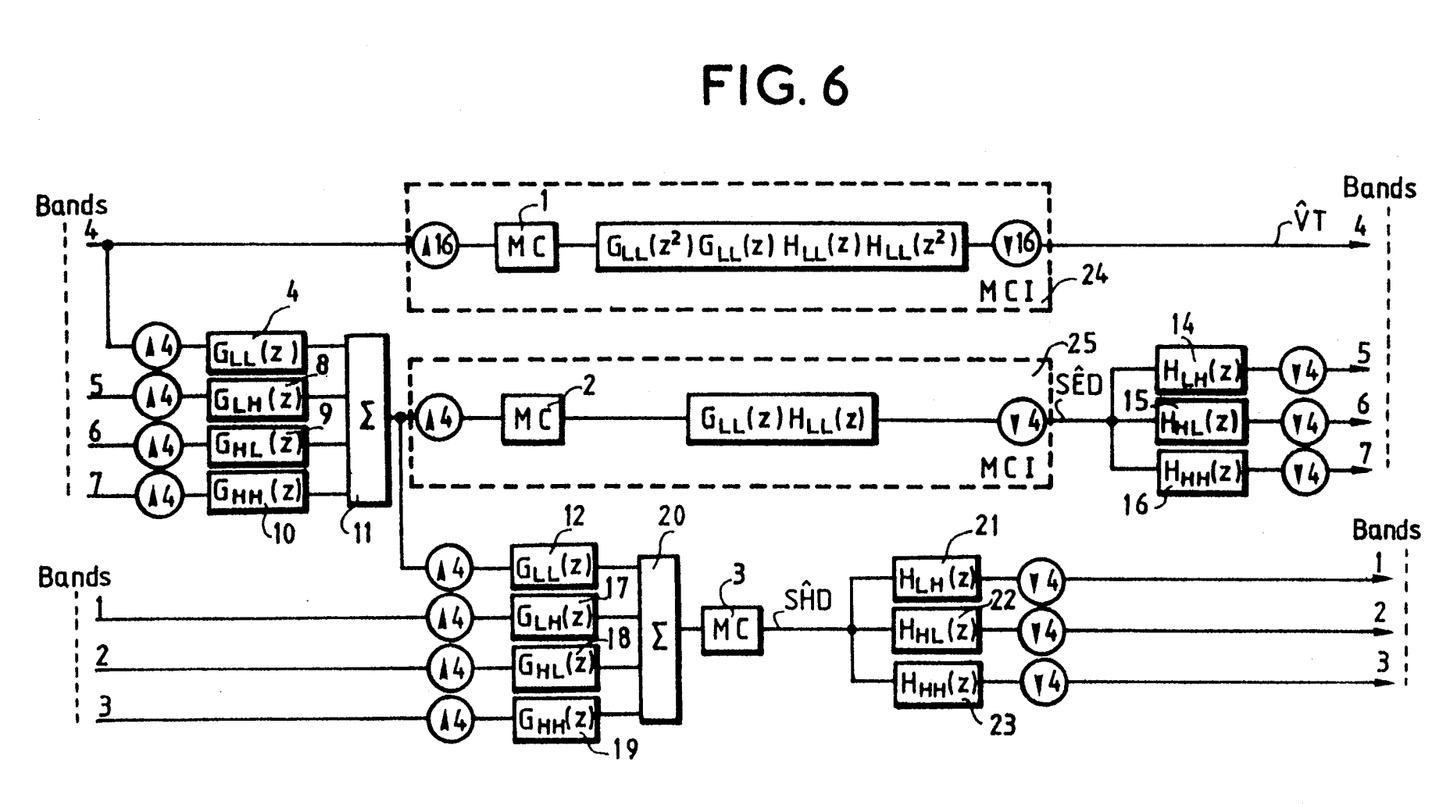

An embodiment of a motion compensation device equivalent to that of FIG. 5 is represented in FIG. 6 in order to demonstrate the transfer functions equivalent to the combinations of interpolation filters 4, 5, 6 and 7 on the one hand, and 12 and 13 on the other.

The transfer function resulting from the set of transfer functions of filters 4, 5, and 7 leading to a prediction for the VT signal in sub-band 4 is represented inside the dashed rectangle 24 and its (z)-transform is given by the relation $$a(z) = G_{LL}(z^2) \cdot G_{LL}(z) \cdot H_{LL}(z) \cdot H_{LL}(z^2).$$

The transfer function resulting from the transfer functions of filters 12 and 13, leading to a prediction for the SED signal at the input of filters 14, 15 and 16, is represented inside the closed dashed rectangle 25 and its (z-transform is given by the relation $b(z) = G_{LL}(z) \cdot H_{LL}(z)$.

As explained earlier the filters with transfer function a(z) and b(z) enable all the decimated pixels to be recalculated. Now, only those towards which a motion vector points are of interest, this signifying that these filters can be split into multiphase components which are shorter and hence easier to enter.

The other elements corresponding to those of FIG. 5 and those in particular leading to the SHD prediction for the SHD signal, are represented with the same references.

The foregoing embodiments make it possible to carry out estimations of motion to a whole pixel with respect to the resolution of the original full-band image.

It is clear that schemes similar to those described earlier may again be produced for smaller motions, to half a pixel in particular, and for this purpose it suffices to create the pixels which do not exist in the original image. This may be achieved by means of a bilinear filter which, for each pixel to be interpolated, now calls upon the four neighbouring pixels of the original mesh.

An embodiment of a Three-level complete coder/decoder incorporating the compensation device described earlier is shown in FIG. 7. It includes, in the coder portion, analysis filter banks 26 and 27 splitting the original full-band image into sub-bands 1 to 7. The banks 26 and 27 distribute the signals decimated by the analysis filters 26 and 27 to three coders corresponding to the three levels of resolution, these coders being formed by quantisation circuits $28_i$ coupled to variable-length coding devices $29_i$ where $i=1, 2$ or 3. Each coder also comprises a subtractor circuit $30_i$ for subtracting from the value of each pixel to be coded as provided by an analysis filter, a prediction value obtained from the motion compensation blocks 24, 25 and 3 described earlier.

Figure 7:
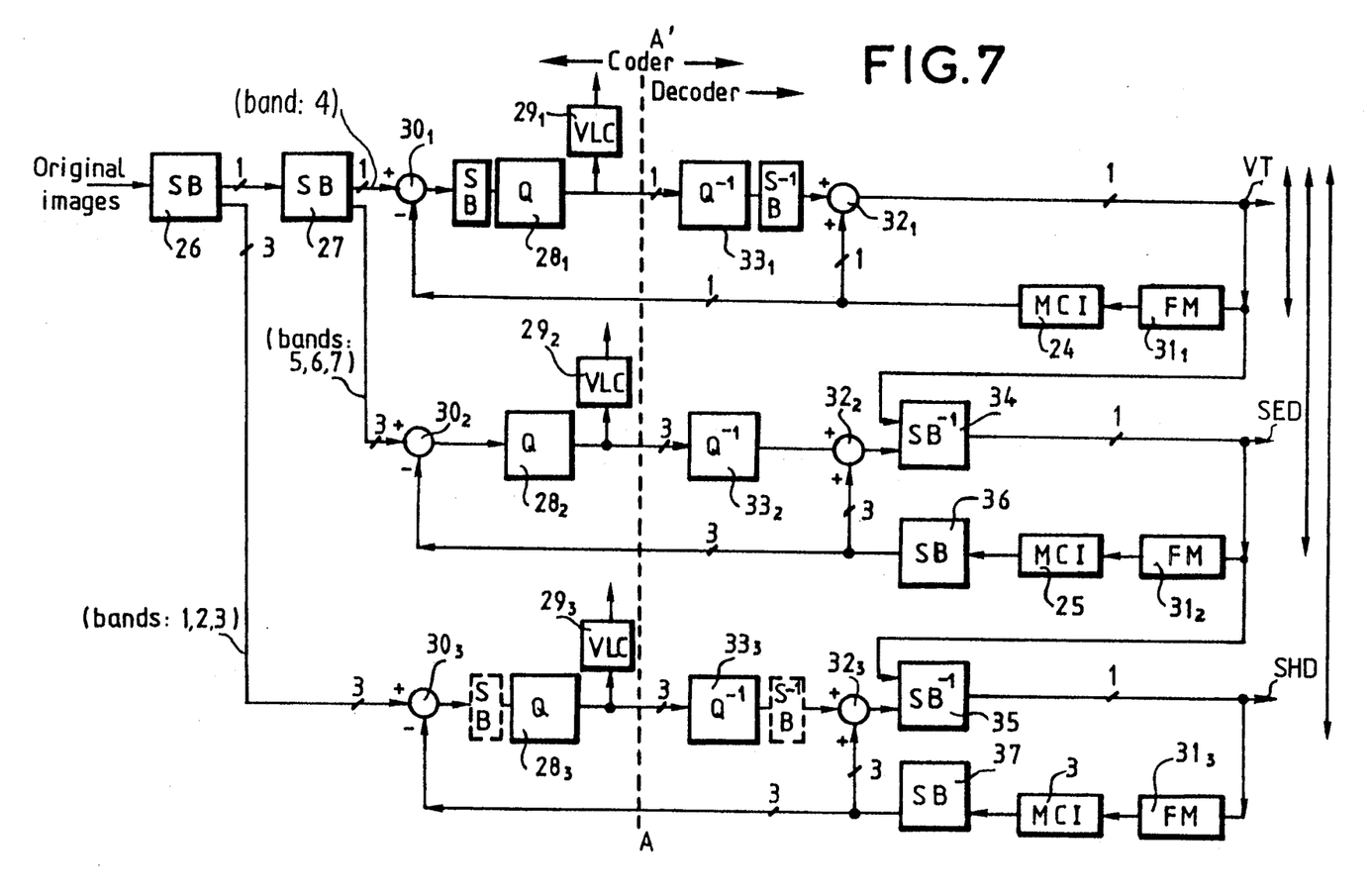
FIG. 7, an embodiment of a coder decoder implementing the motion compensation device of FIGS. 5 and 6.

These blocks receive from a frame memory $31_i$ the pixels of the frame which precedes the current frame. These pixels are reconstituted by an adder circuit $32_i$ from each corresponding datum coded by a coder $29_i$ and dequantised by a dequantiser $33_i$. The reconstituted pixels of the preceding frame are likewise applied to a corresponding input of the adder circuits $30_i$. Analysis filters 34, 35 make it possible, on the one hand, to append the pixels of the VT band to the dequantised pixels obtained from the adder circuit $3_{22}$ in order to form the pixels of the SED band and, on the other hand, to append the pixels of the SED band to the dequantised ones obtained from the adder circuit $3_{23}$ to form the pixels of the SHD band. Analysis filters 36 and 37 provide for the interface between the motion compensation blocks 25 and 3 with the adder circuits $3_{22}$ and $3_{23}$ as well as with the subtractor circuits $3_{02}$ and $3_{03}$ respectively.

In FIG. 7 the elements situated to the right of the dashed line A—A' likewise constitute the decoders of the transmission system.

Naturally the device just described with three prediction loops which make it possible to obtain three levels of compatibility and with which loops there correspond three decoders VT, SED and SaD, can also be confined to a device including only two prediction loops with two levels of compatibility with which levels there correspond only two decoders, SED and SHD.

We claim:

1. An image signal sub-band coder/decoder with different levels of resolution, comprising:
   an input for inputting an image signal;
   a plurality of outputs for outputting signals of different levels of resolution;
   a first plurality of analysis filters, connected to said input, for partitioning a spatio-temporal spectrum of the input image signal from said input into sub-bands which correspond to different levels of resolution of the input image signal;
   a plurality of subtractors, corresponding to a number of said sub-bands, which subtract predicted sub-band signals of a corresponding sub-band from the sub-band signals output from said first plurality of analysis filters and output a result of said subtractions on a corresponding output of each of said plurality of subtractors;
   a first plurality of processing circuits, corresponding to said plurality of subtractors, each having an input connected to the output of the corresponding subtractor and an output for outputting a sub-band residue signal, each of said sub-band residue signals which have been output being an output of the coder/decoder in a coding mode;
   a second plurality of processing circuits, corresponding to the first plurality of processing circuits and performing a process which is inverse to a processing performed by the first plurality of processing circuits, each having an input, said input of each of said second plurality of processing circuits inputting the output of the corresponding one of the first plurality of processing circuits when the coder/decoder is used in a coding mode, and said input of each of said second plurality of processing circuits inputting coded signals when said coder/decoder is used in a decoding mode, each of said second plurality of processing circuits also having an output which outputs a processed signal;
   a plurality of adders, corresponding to said second plurality of processing circuits, each of said plurality of adders having two inputs and an output, a first of said two inputs of each of said plurality of adders connected to the output of the corresponding second processing circuit, a second of said two inputs of each of said plurality of adders inputting a corresponding one of said predicted sub-band signals, and the output of each of said adders outputting reconstructed sub-band signals;
   a second plurality of analysis filters each having a plurality of inputs and an output, wherein a number of said second plurality of analysis filters is at least equal to a number of said different levels of resolution minus 1, each of said second plurality of analysis filters corresponding to one of n highest levels of resolution where n is defined to be a number of levels of resolution minus 1, some of said plurality of inputs of each of said second plurality of analysis filters connected to the output of a corresponding one of said adders and another of said plurality of inputs for inputting an output of one of said outputs of the sub-band coder/decoder of a next lower level of resolution;
   wherein the plurality of outputs of the sub-band coder/decoder for outputting signals of different levels of resolution correspond to the number of different levels of resolution, are for outputting an image signal at the corresponding level of resolution, and each of said plurality of outputs of the image signal sub-band coder/decoder are connected to the output of said second plurality of analysis filters at a corresponding level of resolution when there exists one of said second plurality of analysis filters at the corresponding level of resolution and connected to the output of the adder at the corresponding level of resolution when one of said second analysis filters at the corresponding level of resolution does not exist;

said sub-band coder/decoder further comprising:

a plurality of motion compensation interpolators, corresponding to said plurality of outputs of the image signal sub-band coder/decoder having inputs connected to the corresponding output of the image signal sub-band coder/decoder, for generating a corresponding plurality of motion compensation signals using interpolation;

a third plurality of analysis filters, corresponding in number to the number of the second plurality of analysis filters, each of said third plurality of analysis filters having an input connected to the output of one of said plurality of motion compensation interpolators for levels of resolution having the second plurality of analysis filters and having outputs thereof connected to one of said plurality of subtractors at the corresponding sub-band level and supplying the corresponding motion compensation signals as said predicted sub-band signals of the corresponding level of resolution, and connected to the second input of the adder at the corresponding sub-band level;

wherein the subtractor and the adder at sub-band levels which do not have one of the third plurality of analysis filters have respective inputs thereof connected to the output of the motion compensation interpolator of the level thereof to input the motion compensation signals output by the corresponding motion compensation interpolator as the predicted sub-band signal at the level thereof.

2. A coder/decoder according to claim 1, wherein said different levels of resolution include the videophone (VT), sequential high-definition (SHD), and sequential extended definition (SED) standards.

3. A coder/decoder according to claims 1 or 2, wherein one of said plurality of motion compensation interpolators which is for a sequential extended definition (SED) sub-band includes a filtering device with transfer function $G_{LL}(Z).H_{LL}(Z)$ in series with a motion compensation device coupled to an output of an oversampling device for oversampling by two and to an input of a device for decimation by two, in the horizontal and vertical directions of the image, a first set of filters for reconstructing the SED standard image from the sub-bands adjacent to the VT sub-band and from the VT standard reconstructed image coupled to an input of the oversampling device for oversampling by two, and a second set of filters coupled to an output of the device for decimation by 2 in order to yield a prediction in each of the sub-bands adjacent to the VT sub-band.

4. A coder/decoder according to claims 1 or 2, wherein one of said plurality of motion compensation interpolators which is for a sequential high definition (SHD) sub-band includes a first set of filters coupled to an input of a motion compensation device for calculating a prediction for the SHD standard image by taking into account sub-bands adjacent to the SED sub-bands and a reconstructed SED standard image, and a second set of filters coupled to an output of the motion compensation device in order to provide a prediction in each of the sub-bands adjacent to the SED sub-bands.

5. A coder/decoder according to 1, wherein the motion compensation interpolators include bilinear filters.

6. A coder/decoder according to claims 1 or 2, wherein a motion estimation performed by the motion compensation interpolators takes place to a ½ pixel.

7. A coder/decoder according to claims 1 or 3 wherein one of said plurality of motion interpolators for a sub-band corresponding to the videophone resolution (VT) includes a filtering device with transfer function $G_{LL}(Z^2).G_{LL}(Z).H_{LL}(Z^2)$ coupled at an input thereof and through a motion compensation device, to a first oversampling device for twice performing two times oversampling of the VT standard reconstructed image in horizontal and vertical directions of the image, and coupled at an output thereof to a decimation device for twice performing two times decimation in horizontal and vertical directions of an obtained image, $G_{LL}(Z)$ and $H_{LL}(Z)$ being low-pass filter transfer functions.

8. A coder/decoder according to claims 1 or 2, wherein:

the image is reconstructed by adding oversampled and filtered signals of a lower resolution reconstructed image to oversampled and filtered signals of the reconstructed sub-band signals corresponding to the level of resolution of the image.

* * * * *